US007986642B2

(12) United States Patent
Ishimoto

(10) Patent No.: US 7,986,642 B2
(45) Date of Patent: Jul. 26, 2011

(54) WIRELESS NETWORK SYSTEM, AND WIRELESS DEVICE INCLUDED IN THE SYSTEM

(75) Inventor: Kan Ishimoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 698 days.

(21) Appl. No.: 12/056,080

(22) Filed: Mar. 26, 2008

(65) Prior Publication Data

US 2008/0240068 A1    Oct. 2, 2008

(30) Foreign Application Priority Data

Mar. 30, 2007  (JP) ................................ 2007-094651

(51) Int. Cl.
  *H04W 60/00*  (2009.01)
  *H04W 76/00*  (2009.01)
  *H04W 48/18*  (2009.01)
  *H04W 88/12*  (2009.01)
  *G06F 21/20*  (2006.01)

(52) U.S. Cl. ..... 370/255; 370/338; 370/349; 455/435.1; 713/168; 713/185; 713/193

(58) Field of Classification Search .................. 370/254, 370/255, 312, 313, 314, 315, 316, 328, 329, 370/338, 349; 709/220, 242; 713/1, 168, 713/170, 171, 185, 193; 726/3; 455/420, 455/435.1, 435.2

See application file for complete search history.

(56) References Cited

U.S. PATENT DOCUMENTS 7,075,897 B2 * 7/2006 Uematsu ....................... 370/255

(Continued)

FOREIGN PATENT DOCUMENTS

JP  2003-338821 A  11/2003

OTHER PUBLICATIONS

"Buffalo Wireless LAN broadband router WZR-AMPG144NH", dated Feb. 15, 2007, retrieved on line on Mar. 1, 2007, 2007 from the Internet: <URL: http://buffalo.jp/products/catalog/network/wzr-ampg144nh/> (a concise explanation of the relevance of this document is incorporated into the specification at Para. [0005]).

(Continued)

*Primary Examiner* — Chi H Pham
*Assistant Examiner* — Ahmed Elallam
(74) *Attorney, Agent, or Firm* — Baker Botts L.L.P.

(57) ABSTRACT

A wireless network system having an access point, and wireless devices capable of wireless communication with the access point, each wireless device being capable of wireless communication with the other wireless device in an ad hoc mode without via the access point, wherein the access point includes a registrar setup portion to set up any of the wireless devices as a registrar which permits wireless communication between each wireless device and the access point, and each wireless device includes: a memory portion for storing identifiers of the wireless devices; a data-supply requesting portion operable in the ad hoc mode to transmit to the other wireless device a data-supply request packet requesting the other wireless device to transmit the identifier of the other wireless device stored in its memory portion; a request replying portion operated in response to the data-supply request packet to transmit to the other wireless device a data-supply-request reply packet including an own identifier; a reply-data receiving portion operable to receive the data-supply-request reply packet; an identifier retrieving portion operable to retrieve the identifier from the received data-supply-request reply packet, and store the retrieved identifier in its memory portion; and a registrar registering portion operable after the wireless device is set up as the registrar by the registrar setup portion (88) of the access point, to register the other wireless device the identifier of which is stored in the memory portion, as the wireless device which is permitted to effect wireless communication with the access point.

12 Claims, 12 Drawing Sheets

U.S. PATENT DOCUMENTS

| | | | | |
|---|---|---|---|---|
| 7,286,825 B2 * | 10/2007 | Shishido et al. | ............ | 455/435.1 |
| 7,383,045 B2 * | 6/2008 | Tamura et al. | ................ | 455/433 |
| 7,450,517 B2 * | 11/2008 | Cho | ............................ | 370/238 |
| 7,742,602 B2 * | 6/2010 | Ishidoshiro et al. | .......... | 380/270 |
| 7,814,322 B2 * | 10/2010 | Gurevich et al. | ............. | 713/171 |
| 2002/0147819 A1 * | 10/2002 | Miyakoshi et al. | ............ | 709/228 |
| 2004/0131187 A1 * | 7/2004 | Takao et al. | ................... | 380/255 |
| 2006/0111097 A1 * | 5/2006 | Fujii | ............................ | 455/420 |
| 2006/0171388 A1 * | 8/2006 | Ikeda | ............................ | 370/389 |
| 2006/0239208 A1 * | 10/2006 | Roberts et al. | ................ | 370/254 |
| 2007/0141987 A1 * | 6/2007 | Weinans et al. | ............... | 455/41.2 |
| 2008/0037444 A1 * | 2/2008 | Chhabra | ........................ | 370/254 |

OTHER PUBLICATIONS

"Wi-Fi Alliance, Wi-Fi Certified for Wi-Fi Protected Setup: Easing the User Experience for Home and Small Office Wi-Fi Networks, [online], Wi-Fi Alliance, 2007, [Retrieved on Mar. 1, 2007]. Retrieved from the Internet: <URL:http:// www.wifialliance.com/files/wp_18_20070108_Wi-Fi_Protected_Setup_WP_FINAL.pdf>" (discussed in the specification at Paras. [0005] and [0022]).

* cited by examiner

FIG.10

| MAC ADDRESS | IDENTIFIER |
|---|---|
| 00:80:77:11:11:11 | aaa |
| 00:80:77:11:12:13 | bbb |
| 00:80:77:11:22:33 | ccc |

FIG.12
| MAC ADDRESS | IP ADDRESS | IDENTIFIER |
|---|---|---|
| 00:80:77:11:11:11 | 10.133.100.1 | aaa |
| 00:80:77:11:12:13 | 10.133.100.2 | bbb |
| 00:80:77:11:22:33 | 10.133.100.3 | ccc |
FIG.13
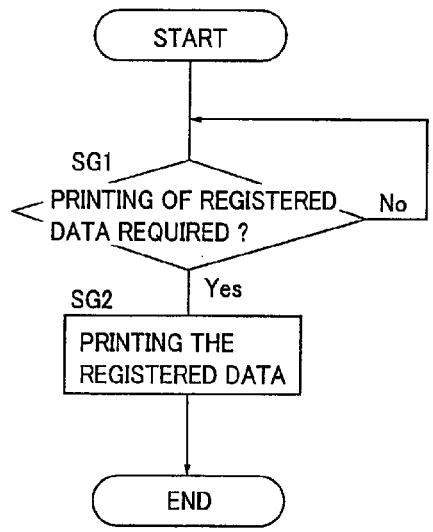
FIG.14
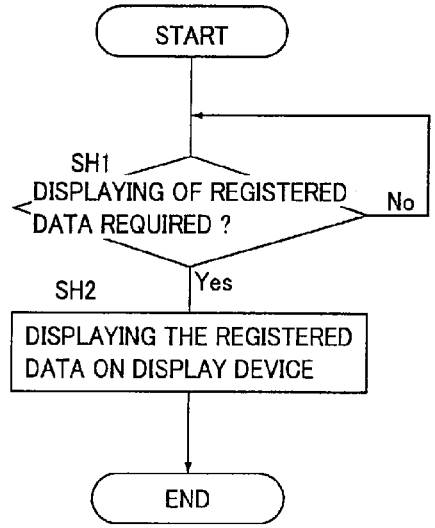

WIRELESS NETWORK SYSTEM, AND WIRELESS DEVICE INCLUDED IN THE SYSTEM

CROSS REFERENCE TO RELATED APPLICATION

This present application claims priority from Japanese Patent Application No. JP-2007-094651 filed on Mar. 30, 2007, the disclosure of which is incorporated herein by reference in its entirety.

BACKGROUND OF THE INVENTION

1. Field of the Invention

The present invention relates in general to a wireless network system constituted by an access point and a plurality of wireless devices, and these wireless devices, and more particularly to techniques that permit the wireless devices to easily join the wireless network system.

2. Description of Related Art

There have been proposed wireless networks using an electromagnetic wave as a physical medium, in place of conventional networks using cables or wires. A wireless LAN (Local area Network) designed according to IEEE802.11 standards is an example of the wireless LAN. JP-2003-338821 A discloses an example of a technique for interconnecting a plurality of wireless devices for radio communication with each other in such a wireless network.

The wireless LAN has two different communication modes called "ad hoc mode" in which the wireless devices are operated to communicate with each other, and "infrastructure mode" in which the wireless devices are not operated for direct communication with each other, but are operated for communication with each other through the access point which governs the wires LAN.

The wireless LAN described above is usually set up such that the wireless LAN is constituted by only intended wireless devices and access point, to prevent connection of the intended wireless devices to unintended wireless devices and access point, or to prevent the unintended wireless devices and access point from joining the wireless LAN. Such a setup of the wireless LAN must be performed in both the access point and the wireless devices. Where the wireless LAN includes a large number of intended wireless devices, the setup is cumbersome and time-consuming.

To solve the problem indicated above, Wi-Fi Alliance proposed a WPS [Wi-Fi (registered trademark) Protected Setup] method for easy setup of the wireless LAN. Wireless devices according to the WPS method are commercially available. An example of the WPS method is disclosed in "BUFFALO Wireless LAN broadband router WZR-AMPG144NH" retrieved on line on Mar. 1, 2007 from the Internet: URL: http://buffalo.jp/products/catalog/network/wzr-ampg144nh/". In this WPS method, the task required to setup the access point and wireless devices of the wireless LAN is reduced by automatic generation of SSID (Service Set Identifier) which is the name of the network constituted by the access point and wireless devices, and WPA2 which is the security key for encryption communication between the access point and the wireless devices, as disclosed in "Wi-Fi Alliance, Wi-Fi CERTIFIED for Wi-Fi Protected Setup: Easing the User Experience for Home and Small Office Wi-Fi Networks, [online], Wi-Fi Alliance, 2007, retrieved on 2007-03-01 from the Internet: URL:http://www.wifialliance.com/files/wp.sub.—18.sub.—20070108_Wi-Fi_Protected_Setup_WP_FINAL.pdf".

For setting up the wireless LAN according to the WPS method, there are available a Push Button Configuration (PBC) approach and a PIN (Personal Information Number) code approach. According to the Push Button Configuration approach, users pushes buttons provided on the access point and wireless devices, for mutual communication of information for setting up the wireless LAN and storing identifiers of the wireless devices in a registrar (which is a selected one of the wireless devices), so that the wireless devices are automatically enabled to communicate with the access point. According to the PIN code approach, on the other hand, a PIN code (eight-digit number, for example) as an identifier which identifies each wireless device is registered in the registrar, so that the wireless devices are automatically enabled to communicate with the access point.

SUMMARY OF THE INVENTION

However, the PIN code approach still has a problem that the PIN codes must be registered in the registrar, for each of all wireless devices. This problem is serious particularly where the network includes a large number of wireless devices.

The present invention was made in view of the background art described above. It is a first object to provide a wireless network system which permits easy registration of identifiers of the wireless devices to enable the wireless devices to communicate with the access point. It is a second object to provide a wireless device the identifier of which can be easily registered in the registrar.

The first object indicated above can be achieved according to a first aspect of this invention, which provides wireless network system comprising an access point, and a plurality of wireless devices capable of wireless communication with the access point, each of the wireless devices being capable of wireless communication directly with the other wireless device in an ad hoc mode without communication with the access point, wherein the access point includes a registrar setup portion configured to set up any of the wireless devices as a registrar which permits wireless communication between each of the wireless devices and the access point, and wherein each of the wireless devices includes (a) a memory portion for storing identifiers of the wireless devices, (b) a data-supply requesting portion configured to be operable in the ad hoc mode to transmit at a predetermined time interval to the other wireless device a data-supply request packet requesting the other wireless device to transmit the identifier of the other wireless device stored in the memory portion of the other wireless device, (c) a request replying portion configured to be operated in response to the data-supply request packet received from the other wireless device, to transmit to the other wireless device a data-supply-request reply packet including an own identifier, (d) a reply-data receiving portion configured to receive the data-supply-request reply packet transmitted from the other wireless device, (e) an identifier retrieving portion configured to retrieve the identifier from the data-supply-request reply packet received by the reply-data receiving portion, and store the retrieved identifier in the memory portion, and (f) a registrar registering portion configured to be operable after each wireless device is set up as the registrar by the registrar setup portion of the access point, to register the other wireless device the identifier of which is stored in the memory portion, as the wireless device which is permitted to effect wireless communication with the access point.

In the wireless network system constructed according to the first aspect of this invention described above, each wireless device includes the memory portion for storing the identifiers of the wireless devices, the data-supply requesting portion operable in the ad hoc mode to transmit at a predetermined time interval to the other wireless device the data-supply request packet requesting the other wireless device to transmit the identifier of the other wireless device stored in the memory portion of the other wireless device, the request replying portion operated in response to the data-supply-request packet received from the other wireless device, to transmit to the other wireless device the data-supply-request reply packet including the own identifier, the reply-data receiving portion operable to receive the data-supply-request reply packet transmitted from the other wireless device, and the identifier retrieving portion operable to retrieve the identifier from the data-supply-request reply packet received by the reply-data receiving portion, and store the retrieved identifier in the memory portion. Each wireless device further includes the registrar registering portion operable after the wireless device is set up as the registrar by the register setup portion of the access point, to register the other wireless device the identifier of which is stored in the memory portion, as the wireless device which is permitted to effect wireless communication with the access point. Since the identifier of the other wireless device is retrieved by the identifier retrieving portion and stored in the memory portion, the user is not required to store the identifiers of the other wireless devices in the memory portion, so that the other wireless devices can be easily added to the wireless network system.

The identifiers of the wireless devices of the wireless network system are stored in the memory portion of each wireless device through the data-supply requesting portion, data-supply-request replying portion, reply-data receiving portion and identifier retrieving portion of each wireless device. Therefore, the same identifiers are stored in the memory portions of all of the plurality of wireless devices. Accordingly, the wireless network system can be constituted by the plurality of wireless devices, irrespective of one of the wireless devices which is selected as the registrar by the registrar setup portion of the access point.

According to a first preferred form of the first aspect of the present invention, each of the wireless devices further includes a reply setup portion configured to selectively enable or disable the request replying portion to operate. In this form of the invention, the operation of the request replying portion is selectively permitted or inhibited by the reply setup portion. If the request replying portion is disabled by the reply setup portion, that is, if the operation of the request replying portion is inhibited, the data-supply-request reply packet is not transmitted from the request replying portion in response to the data-supply request packet received from the other wireless device, so that the own identifier stored in its memory portion is not transmitted to the other wireless device. Thus, the reply setup portion makes it possible to prevent the unintended wireless devices from joining the wireless network system.

According to a second preferred form of the first aspect of the invention, the memory portion further stores device-specific data specifying each wireless device, in relation to the identifier, and the request replying portion transmits the data-supply-request reply packet which includes the identifier and the device-specific data which are related to each other, the reply-data receiving portion receiving the data-supply-request reply packet including the identifier and the device-specific data, the identifier retrieving portion storing the identifier and the device-specific data in the memory portion, and wherein each of the wireless devices includes: a comparator portion configured to compare the identifier stored in the memory portion in relation to the device-specific data, with the identifier received by the reply-data receiving portion together with the same device-specific data, to determine whether the identifier stored in the memory portion is different from the identifier received by the reply-data receiving portion; and an identifier updating portion configured to be operable when the comparator portion has determined that the identifier stored in the memory portion is different from the identifier received by the reply-data receiving portion, to control the identifier retrieving portion such that the identifier stored in the memory portion is replaced by the identifier received by the reply-data receiving portion. In this form of the invention, the identifier and the device-specific data are stored in the memory portion, in relation to each other, and the identifier and the device-specific data are transmitted to the other wireless device. When the comparator has determined that the identifier stored in the memory portion is different from the identifier which is received together with the same device-specific data from the other wireless device through the reply-data receiving portion, the identifier updating portion controls the identifier retrieving portion such that the identifier presently stored in the memory portion in relation to the device-specific data is replaced by or changed to the identifier received by the reply-data receiving portion together with the same device-specific data.

The second object indicated above can be achieved according to a second aspect of the present invention, which provides a wireless device capable of wireless communication with an access point which includes a registrar setup portion configured to set up the wireless device as a registrar which permits wireless communication of the wireless device with the access point, the wireless device being capable of wireless communication directly with another wireless device in an ad hoc mode without communication with the access point, the wireless device comprising (a) a memory portion for storing identifiers of the wireless devices, (b) a data-supply requesting portion configured to be operable in the ad hoc mode to transmit at a predetermined time interval to the above-indicated another wireless device a data-supply request packet requesting the above-indicated another wireless device to transmit the identifier of the above-indicated another wireless device stored in the memory portion of the above-indicated another wireless device, (c) a request replying portion configured to be operated in response to the data-supply request packet received from the above-indicated another wireless device, to transmit to the above-indicated another wireless device a data-supply-request reply packet including an own identifier, (d) a reply-data receiving portion configured to receive the data-supply-request reply packet transmitted from the above-indicated another wireless device, (e) an identifier retrieving portion configured to retrieve the identifier from the data-supply-request reply packet received by the reply-data receiving portion, and store the retrieved identifier in the memory portion, and (f) a registrar registering portion configured to be operable after said each wireless device is set up as the registrar by the registrar setup portion of the access point, to register the above-indicated another wireless device the identifier of which is stored in the memory portion, as the wireless device which is permitted to effect wireless communication with the access point.

The wireless device constructed according to the second aspect of this invention described above is capable of wireless communication directly with another wireless device in the ad hoc mode without communication with the access point. In the present wireless device, the memory portion is arranged to store identifiers of wireless devices, and the data-supply requesting portion is configured to be operable in the ad hoc mode to transmit at a predetermined time interval to above-indicated another wireless device the data-supply request packet requesting the above-indicated another wireless device to transmit the identifier of the above-indicated another wireless device stored in the memory portion of the above-indicated another wireless device. Further, the request replying portion is configured to be operated in response to the data-supply request packet received from the above-indicated another wireless device, to transmit to the above-indicated another wireless device a data-supply-request reply packet including an own identifier, and the reply-data receiving portion is configured to receive the data-supply-request reply packet transmitted from the above-indicated another wireless device. In addition, the identifier retrieving portion is configured to retrieve the identifier from the data-supply-request reply packet received by the reply-data receiving portion, and store the retrieved identifier in the memory portion, if the retrieved identifier has not already been stored in the memory portion, and the registrar registering portion is configured to be operable after the present wireless device is set up as the registrar by the registrar setup portion of the access point, to register the above-indicated another wireless device the identifier of which is stored in the memory portion, as the wireless device which is permitted to effect wireless communication with the access point. Since the identifier of another wireless device is retrieved by the identifier retrieving portion and stored in the memory portion, the user is not required to store the identifier of another wireless device in the memory portion, so that another wireless devices can be easily added to a wireless network system.

Where a wireless network system includes a plurality of wireless devices each of which is constituted according to the second aspect of the invention, the identifiers of the wireless devices of the wireless network system are stored in the memory portion of the wireless device through the data-supply requesting portion, data-supply-request replying portion, reply-data receiving portion and identifier retrieving portion of each wireless device. Therefore, the same identifiers are stored in the memory portions of all of the plurality of wireless devices. Accordingly, the wireless network system can be constituted by the plurality of wireless devices, irrespective of one of the wireless devices which is selected as the registrar by the access point.

According to a first preferred form of the second aspect of the invention, the wireless device further comprises a reply setup portion configured to selectively enable or disable the request replying portion to operate. In this form of the invention, the operation of the request replying portion is selectively permitted or inhibited by the reply setup portion. If the request replying portion is disabled by the reply setup portions that is, if the operation of the request replying portion is inhibited, the data-supply-request reply packet is not transmitted from the request replying portion in response to the data-supply request packet received from the other wireless device, so that the own identifier stored in its memory portion is not transmitted to the other wireless device. Thus, the reply setup portion makes it possible to prevent the unintended wireless devices from joining the wireless network system.

According to a second preferred form of the second aspect of the invention, the memory portion further stores device-specific data specifying the wireless device, in relation to the identifier, and the request replying portion transmits the data-supply-request reply packet which includes the identifier and the device-specific data which are related to each other, the reply-data receiving portion receiving the data-supply-request reply packet including the identifier and the device-specific data, the identifier retrieving portion storing the identifier and the device-specific data in the memory portion, and wherein each of the wireless devices includes: a comparator portion configured to compare the identifier stored in the memory portion in relation to the device-specific data, with the identifier received by the reply-data receiving portion together with the same device-specific data, to determine whether the identifier stored in the memory portion is different from the identifier received by the reply-data receiving portion; and an identifier updating portion configured to be operable when the comparator portion has determined that the identifier stored in the memory portion is different from the identifier received by the reply-data receiving portion, to control the identifier retrieving portion such that the identifier stored in the memory portion is replaced by the identifier received by the reply-data receiving portion. In this form of the invention, the identifier and the device-specific data are stored in the memory portion, in relation to each other, and the identifier and the device-specific data are transmitted to the other wireless device. When the comparator has determined that the identifier stored in the memory portion is different from the identifier which is received together with the same device-specific data from the other wireless device through the reply-data receiving portion, the identifier updating portion controls the identifier retrieving portion such that the identifier presently stored in the memory portion in relation to the device-specific data is replaced by or changed to the identifier received by the reply-data receiving portion together with the same device-specific data.

BRIEF DESCRIPTION OF THE DRAWING

The above and other objects, features and industrial significance of this invention will be better understood by reading the following detailed description of preferred embodiments of the invention, when considered in connection with the accompanying drawings in which:

FIG. 10 is a view indicating an example of the registered data;

FIG. 12 is a view corresponding to that of FIG. 10, indicating an example of registered data where an IP address is used to specify the wireless device;

FIG. 13 is a flow chart illustrating an operation of the wireless device where the wireless device has a function of printing the registered data, in a third embodiment of the invention;

FIG. 14 is a flow chart illustrating an operation of the wireless device where the wireless device has a function of displaying the registered data, in a fourth embodiment of the invention;

DETAILED DESCRIPTION OF THE PREFERRED EMBODIMENTS

Figure 1:
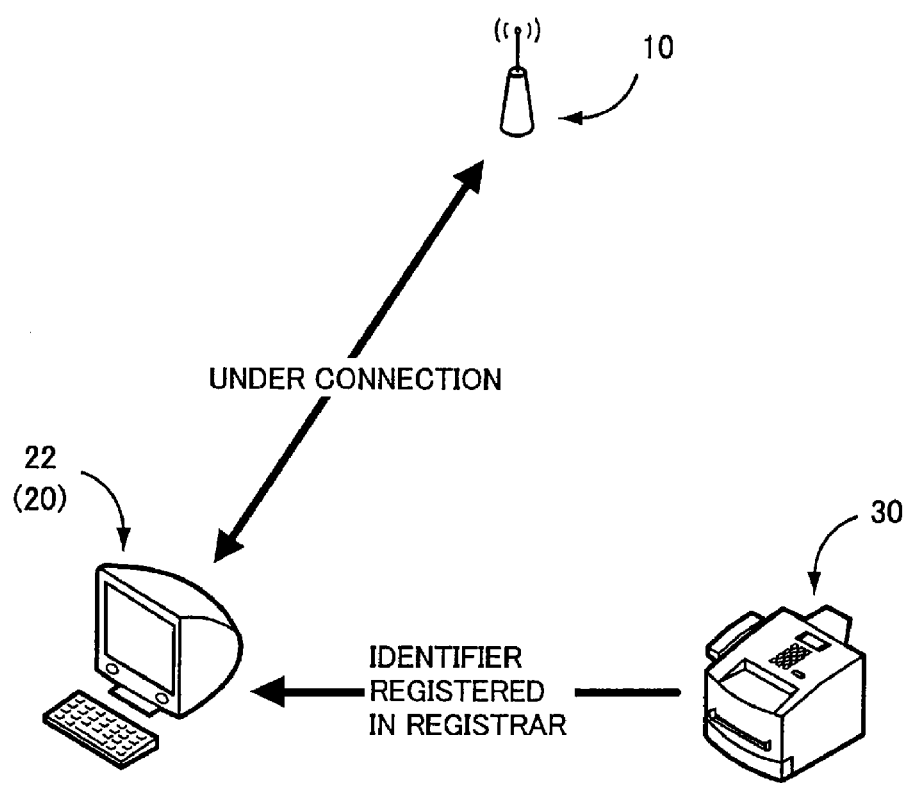
FIG. 1 is a schematic view showing devices constituting a wireless LAN.

The preferred embodiments of the present invention will be described in detail by reference to the drawings. Referring first to FIG. 1, there are shown devices which constitute a wireless LAN. As shown in FIG. 1, the wireless LAN includes an access point 10, a registrar 20, and at least one wireless device 30 (only one device 30 shown in FIG. 1). The access point 10 is provided to permit communication between another network (not shown) connected to the access point 10, and the wireless device or devices 30 connected in a wireless fashion to the access point 10 of the present wireless LAN, or wireless or radio communication between a plurality of wireless devices 30 connected in the wireless fashion to the access point 10.

The registrar 20 is configured to store a PIN code, which is an identification number identifying each wireless device 30 that is permitted to effect radio communication with the access point 10. When the access point 10 receives a communication request from the wireless device 30, the access point 10 communicates with the registrar 20 to check whether the wireless device 30 in question is one of the wireless devices 30 the PIN codes of which are stored in the registrar 20. Only where the wireless device 30 in question is registered in the registrar 20, the access point 10 communicates with the wireless device 30 in question. In the present specific example, the registrar 20 is a wireless device in the form of a personal computer (PC) 22 capable of radio communication with the access point 10. Namely, the personal computer 22 functions as the registrar 20 of the wireless LAN. Thus, the registrar 20 is an external registrar provided outside the access point 10.

As a method for adding another or a new wireless device to the present wireless network (wireless LAN) shown in FIG. 1, there is available the PIN code approach disclosed, as an example of the WPS (Wi-Fi Protected Setup) method, in the previously identified document entitled "Wi-Fi Alliance, Wi-Fi CERTIFIED for Wi-Fi Protected Setup: Easing the User Experience for Home and Small Office Wi-Fi Networks". The flow chart of FIG. 2 illustrates an example of the method of adding the new wireless device to the wireless network according to the WPS PIN code approach.

Figure 2:
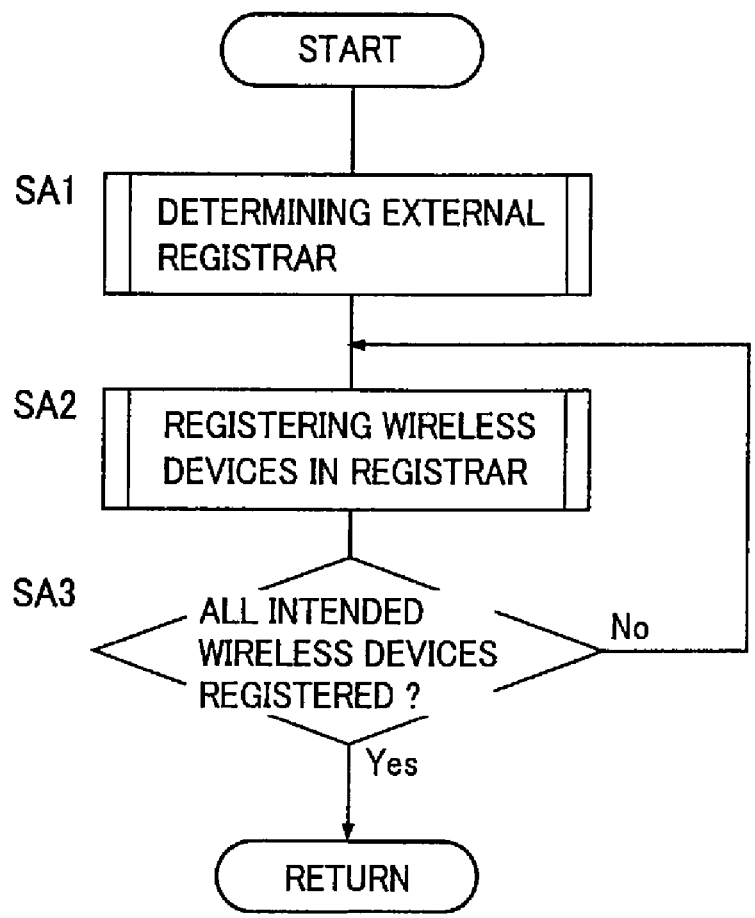
FIG. 2 is a flow chart illustrating a conventional method in which wireless devices are registered by a registrar, to configure a wireless LAN.
Figure 3:
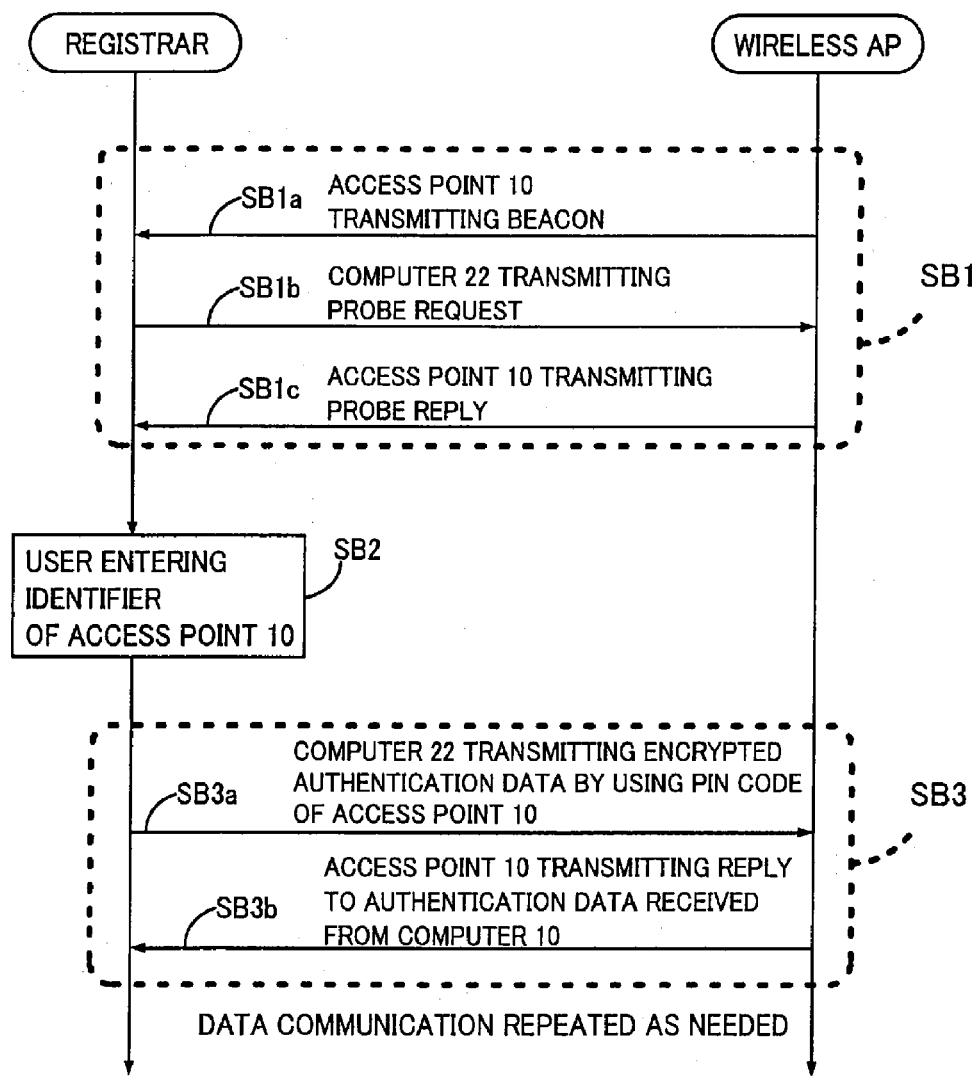
FIG. 3 is a flow chart illustrating a part of the flow chart of FIG. 2, which is a routine for determining an external registrar.

A routine illustrated in the flow chart of FIG. 2 is initiated with step SA1 to perform a registrar determining routine for determining the registrar. The flow chart of FIG. 3 illustrates an example of the registrar determining routine, which is initiated with step SB1 in which communication is effected between the access point 10 and the computer 22 functioning as the registrar 20. Described in detail, the step SB1 is initiated with step SB1a in which a beacon signal is transmitted at a predetermined time interval from the access point 10. Step SB1a is followed by step SB1b in which when the computer 22 capable of radio communication has received the beacon signal, the computer 22 transmits a probe request signal toward the access point 10 from which the beacon signal has been received. Step SB1b is followed by step SB1c in which the access point 10 which has received the probe request signal from the computer 22 transmits a probe reply signal for radio communication with the computer 22. Thus, minimum radio communication between the access point 10 and the computer 22 is effected for an authentication process in step SB3 described below.

Although the radio or wireless communication is effected between the access point 10 and the computer 22 in the step SB1 described above, cable communication between the access point 10 and the computer 22 may be effected through a cable LAN, for instance, or any other type of cable such as USB (Universal Serial Bus) and Serial Cable, provided minimum communication for authentication of the new wireless device in step SB3 is effected.

Step SB1 is followed by step SB2 in which the user enters an identifier in the form of the PIN code of the access point 10 into the computer 22. This PIN code is an 8-digit identification number according to the WPS PIN code approach. The entry of the PIN code may be implemented by using a keyboard (not shown) of the computer 22 through an input/output interface (not shown). The entered PIN code of the access point 10 is used for authentication in the following step SB3.

The following step SB3 is initiated with SB3a in which the computer 22 is registered as the registrar 20 in the access point 10. Described more specifically, the computer 22 encrypts its authentication data by using as an encryption key the PIN code (password) of the access point 10 entered in step SB2, and transmits the encrypted authentication data toward the access point 10 by radio communication.

SB3a is followed by SB3b in which the access point 10 receives the encrypted authentication data of the computer 22, de-encrypts the authentication data, and determines whether the password entered in step SB2 is correct, on the basis of the de-encrypted authentication data. Where the password is correct, the access point 10 registers the computer 22 as the external registrar 20, and transmits to the computer 22 a reply informing that the computer 22 has been registered as the registrar 20. In the manner described above, the computer 22 is enabled to function as the registrar 20 for the access point 10. In this instance, a determination as to whether the communication between the computer 22 and the access point 10 has been effected correctly without data falsification or alteration is made by determining whether a hash value of the transmitted data calculated by the computer 22 is coincident with a hash value of the data de-encrypted by the access point 10. In the event of a failure of the access point 10 to eventually obtain the authentication data of the computer 22 under bad communication environments, for example, the above-described step SB3 is repeatedly implemented for repeated communication between the computer 22 and the access point 10.

Referring back to the flow chart of FIG. 2, step SA1 is followed by step SA2 to perform a routine for adding a new wireless device to the existing wireless LAN. An example of this wireless device adding routine is illustrated in the flow chart of FIG. 4. There will be described the routine for adding the wireless device 30 to the wireless LAN which includes the wireless access point 10 and the personal computer (PC) 22 serving as the registrar 20.

Figure 4:
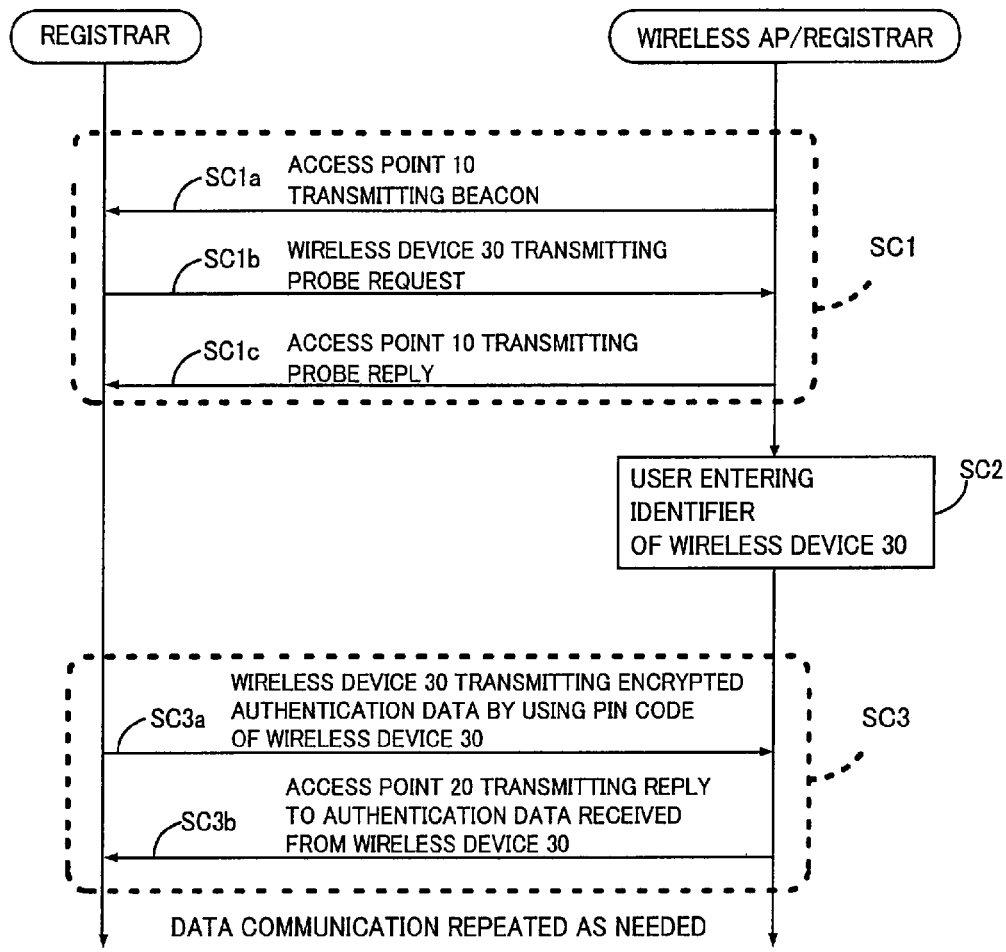
FIG. 4 is a flow chart illustrating another part of the flow chart of FIG. 2, which is a routine for addition of a wireless device by the registrar to join the wireless LAN.

The routine of FIG. 4 is initiated with step SC1 in which communication is effected between the wireless device 30 and the access point 10. Described in detail, the step SC1 is initiated with step SC1a in which a beacon signal is transmitted at a predetermined time interval from the access point 10. Step SC1a is followed by step SC1b in which when the wireless device 30 capable of radio communication has received the beacon signal, the wireless device 30 transmits a probe request signal toward the access point 10 from which the beacon signal has been received. Step SC1b is followed by step SC1c in which the access point 10 which has received the probe request signal from the wireless device 30 transmits a probe reply signal for radio communication with the wireless device 30. Thus, minimum radio communication between the access point 10 and the wireless device 30 is effected for an authentication process in step SC3 described below.

Step SC1 is followed by step SC2 in which the user enters an identifier in the form of the PIN code of the wireless device 30 into the registrar 20. The entry of the PIN code may be implemented by using a keyboard (not shown) of the computer 22 functioning as the registrar 20, through an input/output interface (not shown) of the computer 22. The entered PIN code of the wireless device 30 is used for authentication in the following step SC3.

The following step SC3 is initiated with SC3a in which the wireless device 30 is registered in the registrar 20. Described more specifically, the wireless device 30 encrypts its authentication data by using its PIN code (password) as an encryption key, and transmits the encrypted authentication data toward the registrar 20 through the access point 10.

SC3a is followed by SC3b in which the registrar 20 which has received the encrypted authentication data of the wireless device 30 through the access point 10 de-encrypts the authentication data, and determines whether the password entered in step SC2 is correct, on the basis of the de-encrypted authentication data. Where the password is correct, the registrar 20 registers or enrolls the wireless device 30 as one member of the wireless LAN, and transmits through the access point 10 to the wireless device 30 a reply informing that the wireless device 30 has been registered in the registrar 20. In the manner described above, the wireless device 30 is registered or enrolled in the registrar 20, so that the wireless device 30 is enabled to communicate with the access point 10. In this instance, a determination as to whether the communication between the wireless device 30 and the access point 10 has been effected correctly without data falsification or alteration is made by determining whether a hash value of the transmitted data calculated by the wireless device 30 is coincident with a hash value of the data de-encrypted by the access point 10. In the event of a communication failure under bad communication environments, for example, the above-described step SC3 is repeatedly implemented for repeated communication between the wireless device 30 and the access point 10.

Referring back to the flow chart of FIG. 2, step SA2 is followed by step SA3 to determine whether the step SA2 has been repeated for all of the wireless devices intended to be added to the existing wireless LAN. If a negative determination is obtained in step SA3, the control flow goes back to step SA2 to repeat the routine of FIG. 4. Step SA2 is repeatedly implemented until all of the intended wireless devices have been enabled to join the wireless LAN. After all of the wireless devices intended to be added to the wireless LAN, that is, if an affirmative determination is obtained in step SA3, the routine of FIG. 2 is terminated.

As is apparent from the foregoing description of the conventional method of adding the wireless devices 30 to the existing wireless LAN, the user must enter the PIN code of each wireless device 30 to be registered in the registrar 20, so that the procedure required to register a large number of new wireless devices is cumbersome and time-consuming for the user.

First Embodiment

Figure 5:
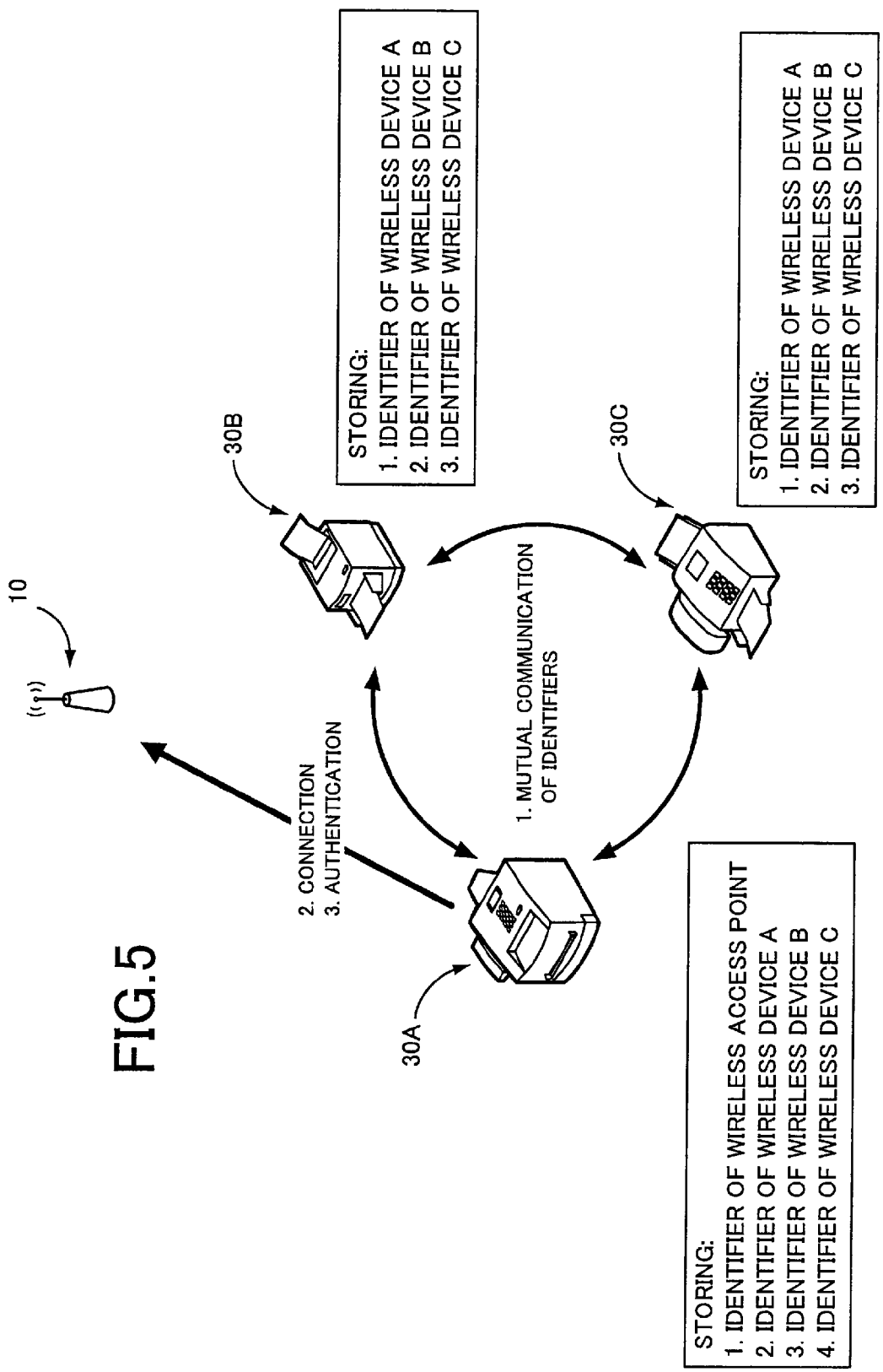
FIG. 5 is a schematic view showing a wireless network system in the form of a wireless LAN constructed according to one embodiment of this invention.

Referring next to the schematic view of FIG. 5, there is shown a wireless network system in the form of a wireless LAN constructed according to the present invention. The wireless LAN shown in FIG. 5 consists of an access point 10, and three wireless devices 30A, 30B and 30C (hereinafter collectively referred to as "wireless devices 30", where appropriate). Initially, these three wireless devices 30 are not registered or enrolled as members of the wireless LAN. In other words, the existing wireless LAN is configured by enabling all of the three wireless devices 30 to communicate with the access point 10.

Figure 6:
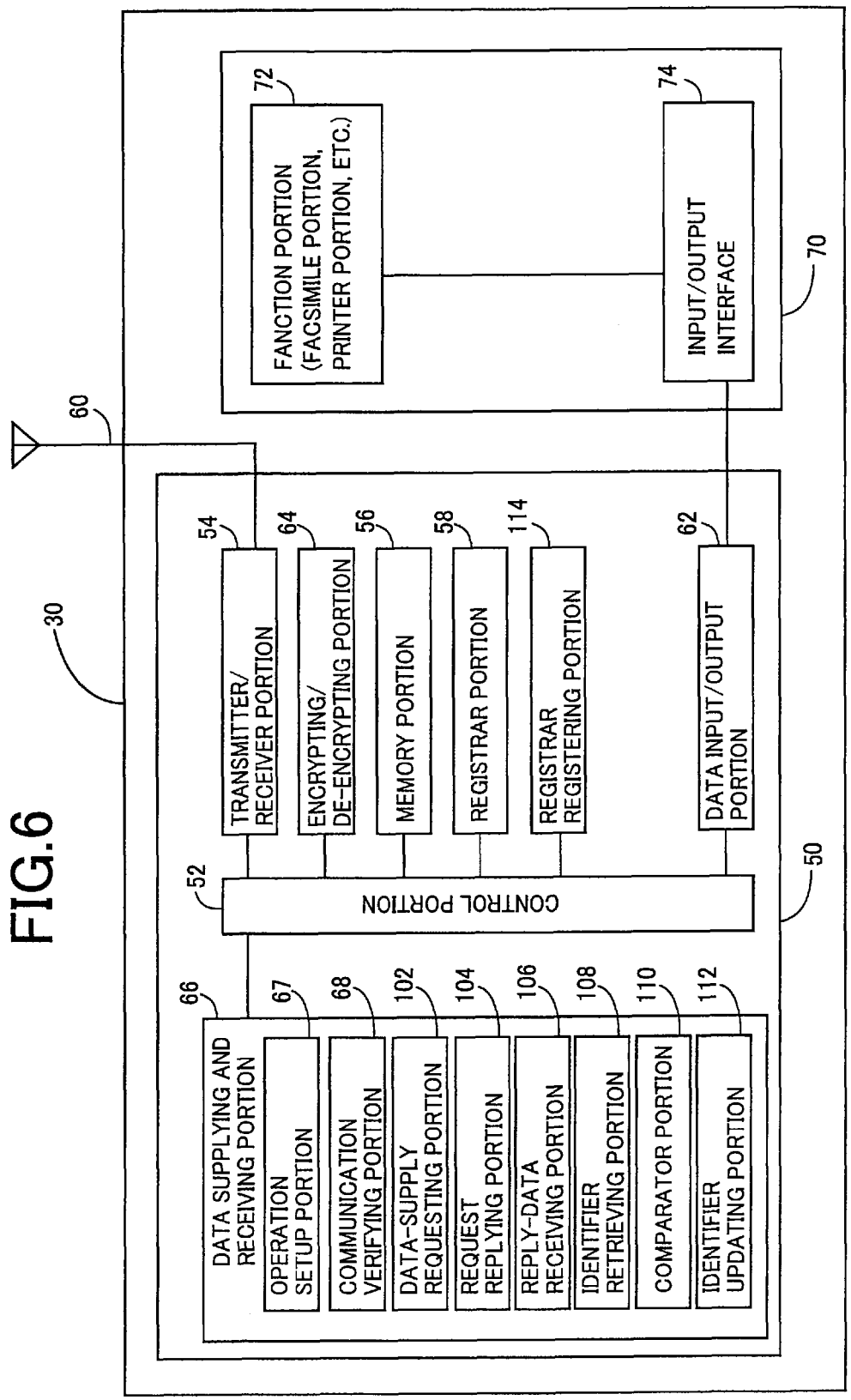
FIG. 6 is a functional block diagram showing functional portions of a wireless device of the wireless LAN of FIG. 5.

Referring next to the functional block diagram of FIG. 6, there are shown functional portions of each of the wireless devices 30, by way of example. The wireless device 30 is a device capable of radio communication, for instance, a personal computer, a printer, a telecopier (facsimile device), or a multi-function device having a plurality of functions such as printing and scanning functions. The wireless device 30 includes a main body portion 70 having desired functions of the personal computer, printer, telecopier or multi-function device, for example, and a communication portion 50 having a radio communication function. The main body portion 70 includes a function portion 72 capable of functioning as the personal computer, printer, telecopier or multi-function device, and an input/output interface 74 for connection to an input device operable by the user and to an output device capable of displaying desired information. Where the wireless device 30 is the printer capable of radio communication, the function portion 72 is a printer portion 72. The wireless device 30 is provided with its identifier in the form of an 8-digit PIN code. Namely, the individual wireless devices 30 has respective identifiers.

The communication portion 50 having the radio communication function includes a control portion 52, a transmitter/receiver portion 54, a memory portion 56, a registrar portion 58, an antenna portion 60, a data input/output portion 62, an encrypting/de-encrypting portion 64, a data supplying and receiving portion 66, and a registrar registering portion 114. The transmitter/receiver portion 54 is configured to encode transmitted data, de-code received data, and effect modulation and de-modulation required for data transmission and reception through the antenna portion 60. The memory portion 56 is configured to store the PIN code of the own wireless device 30, and the PIN codes of the other wireless devices 30 and ancillary data relating to those PIN codes, which are received through the data supplying and receiving portion 66, and is operable to supply the data stored therein to the other wireless devices 30. The identifiers in the form of the PIN codes and the ancillary data relating to the PIN codes, which are stored in the memory portion 56, are hereinafter collectively referred to as "registered data", where appropriate). FIG. 10 indicates an example of the registered data stored in the memory portion 56. In the example of FIG. 10, each set of registered data stored in the memory portion 56 consists of device characteristic data in the form of a MC address specifying the type of the wireless device 30 in question, and the identifier identifying this wireless device 30. The registrar registering portion 104 is configured to register in the registrar 10 the wireless devices 30 intended to be enabled to communicate with the access point 10 of the wireless LAN, according to the PIN codes of the intended wireless devices 30. Namely, the register registering portion 104 is provided to register the intended wireless devices 30 to be added to the existing wireless LAN. The registrar portion 58 is configured to determine, according to a request received from the access point 10, whether the certain wireless device 30 has been registered in the registrar 58. The data input/output portion 62 is configured to supply and receive data to and from the main body portion 70, for data transmission and reception of the main body portion 70. The encrypting/de-encrypting portion 64 is configured to encrypt data to be transmitted from the wireless device 30, and de-encrypt encrypted data received through the data input/output portion 62. The encryption/de-encryption portion 62 may effect data encryption according to the known public key cryptosystem. In this case, data encrypted using the public key are de-encrypted using the private key.

The data supplying and receiving portion 66 is configured to supply the registered data from the memory portion 56 of the own wireless device 30 to the memory portions 56 of the other wireless devices 30, and to receive the registered from the memory portions 56 of the other wireless devices 30. With an operation of the data supplying and receiving portion 66, the registered data of the other wireless devices 30 are stored in the memory portion 56 of the own wireless device 30, together with the registered data of the own wireless device 30. The data supplying and receiving portion 66 includes a data-supply requesting portion 102, a request replying portion 104, a reply-data receiving portion 106, an identifier retrieving portion 108, an operation setup portion 67 and a communication verifying portion 68.

The data-supply requesting portion 102 is configured to transmit, in a broadcasting fashion, a data-supply request packet requesting a supply of registered data stored in the memory portions 56 of the other wireless devices 30, without specifying those other wireless devices 30. The request replying portion 104 is configured to transmit a data-supply-request reply packet including the registered data stored in its memory portion 56, to the wireless device 30 from which the wireless device 30 in question has received the data-supply request packet. The reply-data receiving portion 106 is configured to receive the data-supply reply packet, and retrieve the registered data of the other wireless device 30 which are included in the received data-supply-request reply packet. The identifier retrieving portion 108 is configured to store, in the memory portion 56, the registered data of the other wireless device 30 retrieved by the reply-data receiving portion 106. The operation setup portion 67 is configured to selectively enable or disable the data supplying and receiving portion 66 to operate. When the data supplying and receiving portion 66 is disabled by the operation setup portion 67, an operation of the data supplying and receiving portion 66 to reply to the data-supply request packet is inhibited, namely, the data supplying and receiving portion 66 is inhibited from supplying the registered data of the own wireless device 30 to the other wireless devices 30, and from receiving the registered data from the other wireless devices 30. The communication verifying portion 68 is configured to verify that the communication with the other wireless device 30 for supplying thereto or receiving therefrom the registered data has been effected correctly as a result of de-encryption of the encrypted registered data from the other wireless device 30, without falsification or alteration. Only when the communication verifying portion 68 has verified that the communication has been effected correctly, the communication verifying portion 68 permits the data supplying and receiving portion 66 to receive the registered data from the other wireless device 30, and to supply the registered data of the own wireless device 30 to the other wireless device 30.

The control portion 52 is configured to control the various functional portions of the communication portion 50. Described more specifically, the control portion 52 controls the functional portions of the communication portion 50 to selectively establish an ad hoc mode or an infrastructure mode. In the ad hoc mode, wireless or radio communication of the wireless device 30 in question with the other wireless devices 30 is effected without communication with the access point 10. In the infrastructure mode, the wireless communication of the wireless device 30 in question with the other wireless devices 30 or another network connected to the access point 10 is effected via the access point 10. Since each of the wireless devices 30 of the wireless LAN has the registrar portion 58, any of the wireless devices 30 can operate as the registrar 20 in the wireless LAN.

Figure 7:
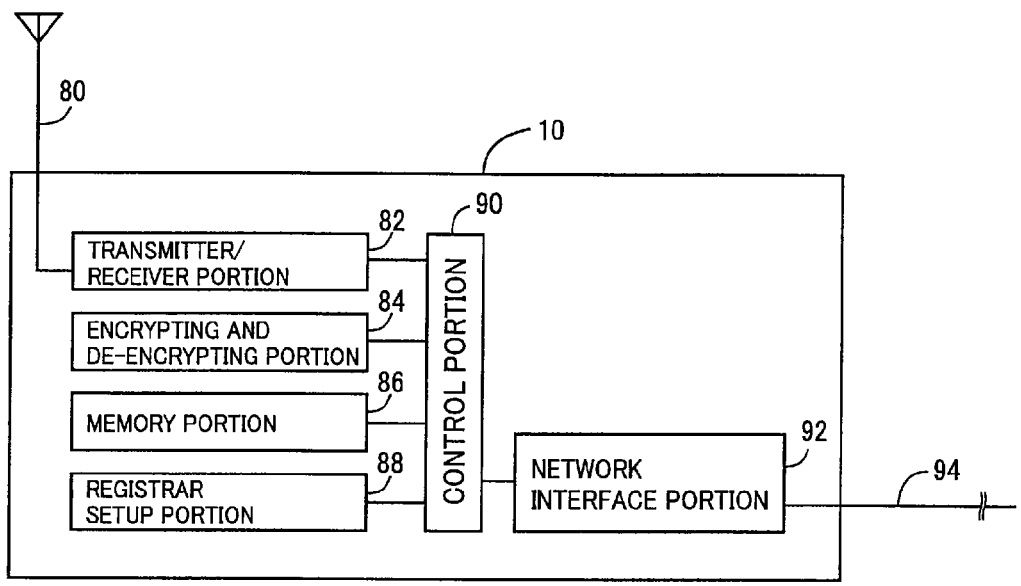
FIG. 7 is a functional block diagram showing functional portions of an access point of the wireless LAN of FIG. 5.

Referring to the functional block diagram of FIG. 7, there are shown functional portions of the access point 10, by way of example. Like each wireless device 30, the access point 10 is provided with its own identifier in the form of the 8-digit PIN code.

The access point 10 includes a control portion 90, a transmitter/receiver portion 82, a memory portion 86, a registrar setup portion 88, an antenna portion 80, a network interface portion 92, and an encrypting and de-encrypting portion 84. Like the transmitter/receiver portion 54 of each wireless device 30, the transmitter/receiver portion 82 is configured to encode transmitted data, de-code received data, and effect modulation and de-modulation required for data transmission and reception through the antenna portion 80. The memory portion 86 is configured to store the PIN code of the access point 10, and data used by the registrar setup portion 88 to authenticate the registrar 20. The registrar setup portion 88 is configured to authenticate any of the wireless devices 30 (wireless devices except the access point 10) as the external registrar. Like the encrypting/de-encrypting portion 64 of each wireless device 30, the encrypting/de-encrypting portion 84 is configured to effect data encryption according to the public key cryptosystem, for example, such that data encrypted using the public key are de-encrypted using the private key. The network interface portion 92 is configured to connect the present wireless LAN (to which the access point 10 belongs) to a cable LAN 94. However, the network interface portion 92 is not essential, and may be provided only where it is desired to connect the present wireless LAN to the cable LAN 94 or any other cable network.

The control portion 90 is configured to control the various functional portions of the access point 10. Described more specifically, the control portion 90 sets up the external registrar 20 through the registrar setup portion 88, contacts the registrar 20 which has been set up, for authentication of the wireless device 30 which tries to communicate with the access point 10, and controls the wireless communication with the wireless device 30 authenticated by the registrar 20, through the transmitter/receiver portion 82.

Figure 8:
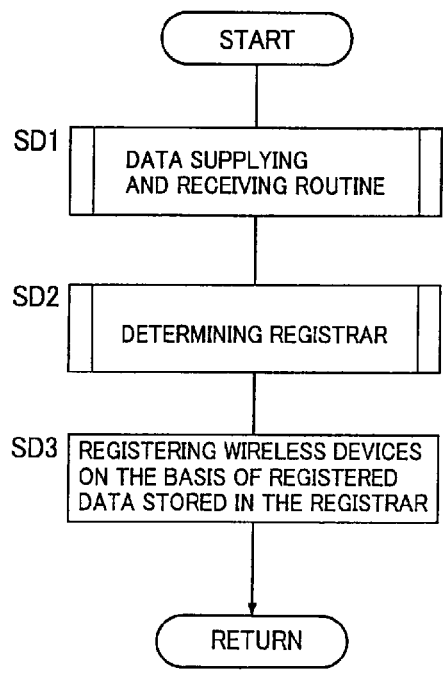
FIG. 8 is a flow chart illustrating an operation to configure the wireless network system of the present invention.

Referring to the flow chart of FIG. 8, there is illustrated an example of a routine to control an operation of the wireless network system in the form of the wireless LAN shown in FIG. 5 constructed according to the present invention, which operation is performed before the plurality of wireless devices 30 and the access point 10 have been set up to configure or constitute the wireless LAN.

The control routine of FIG. 8 is initiated with step SD1 in which each of the wireless devices 30 which have not been set up is placed in the ad hoc mode to perform a data supplying and receiving routine for supplying the other wireless device 30 with the registered data stored in its memory portion 56 and including the identifier in the form of the PIN code, and receiving the registered data stored in the memory portion 56 of the other wireless device 30.

Figure 9:
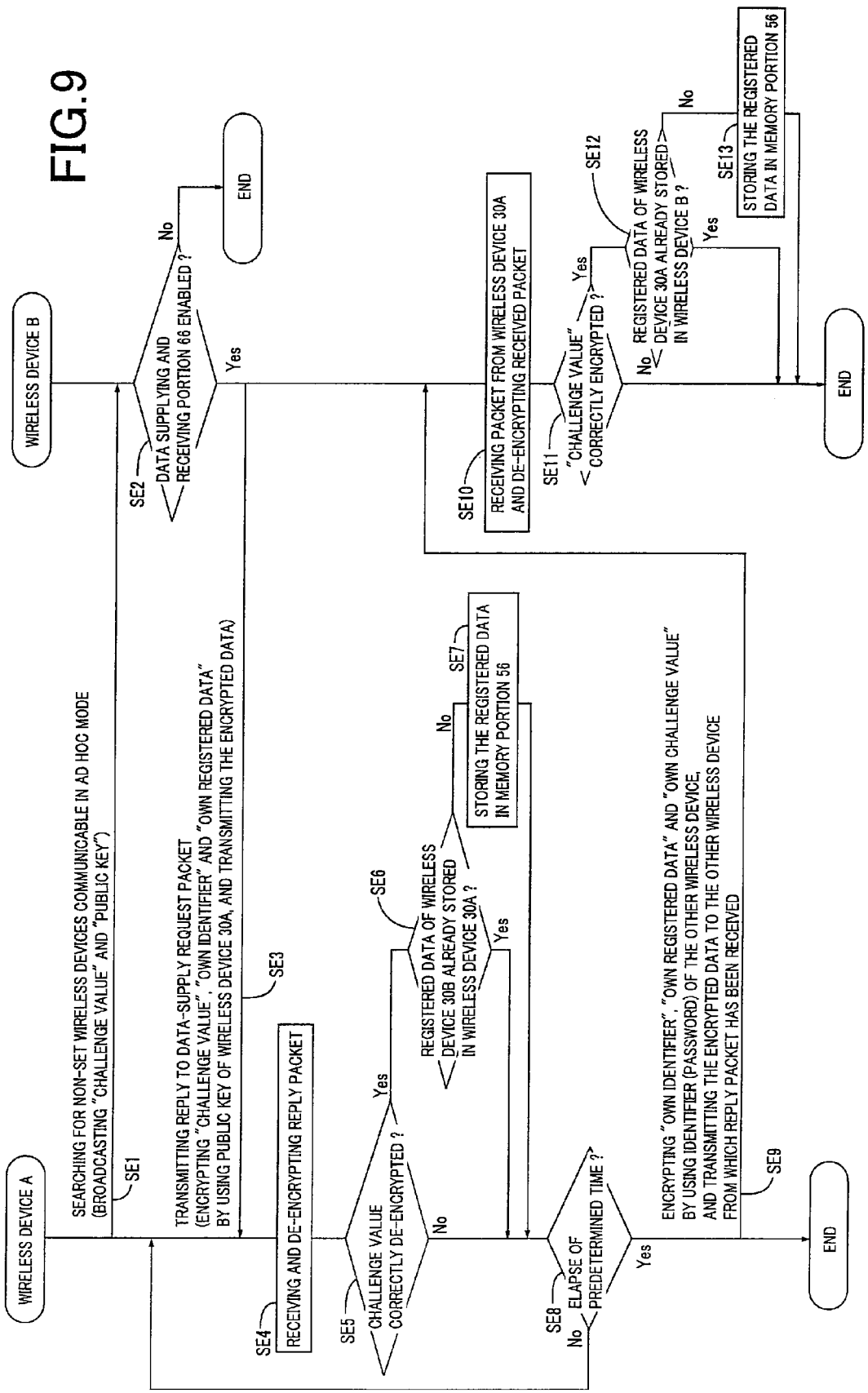
FIG. 9 is a flow chart illustrating a part of the flow chart of FIG. 8, which is a routine for supplying and retrieving registered data.

An example of the data supplying and receiving routine in step SD1 of FIG. 8 according to a first embodiment of this invention is illustrated in the flow chart of FIG. 9. This routine is initiated with step SE1 corresponding to the data-supply requesting portion 102, wherein the wireless device 30A which has not been set up yet searches for the other wireless devices 30 with which the wireless device 30A can communicate in the ad hoc mode. Although the wireless devices 30 have not been set up when the data supplying and receiving routine of FIG. 9 is performed, those wireless devices 30 are able to communicate with each other in the ad hoc mode for performing the data supplying and receiving routine. In this searching step SE1, the wireless device 30A in question transmits information required in step SE3 for authentication of the other wireless devices 30 responding to the search, to all of the other wireless devices 30A of the wireless LAN at one time, namely, transmits the required information in the broadcasting fashion. The information required for the authentication includes, for example, a "challenge value" required where the authentication is made by CHAP (Challenge Handshake Authentication Protocol), and a "public key" required where the communication of the wireless device 30A with the other wireless devices 30 is effected according to the public key cryptosystem.

Step SE1 is followed by step SE2 corresponding to the operation setup portion 67 of the other wireless device 30B which has received in step SE1 the challenge value and the public key from the wireless device 30A. In this step SE2, the wireless device 30B determines whether the operation setup portion 67 has enabled the data supplying and receiving portion 66 to supply and receive the registered data. If an affirmative determination is obtained in step SE2, that is, if the data supplying and receiving portion 66 has been enabled by the operation setup portion 67, the control flow goes to step SE3. If a negative determination is obtained in step SE2, that is, the data supplying and receiving portion 66 has not been enabled, the present routine is terminated.

In the step SE3 corresponding to the request replying portion 104, the wireless device 30B which has received in step SE1 the data-supply request packet from the wireless device 30A transmits a reply to the received data-supply request packet. Described in detail, the encrypting/de-encrypting portion 64 of the wireless device 30B encrypts the challenge value received in step SE1 from the wireless device 30A, the identifier in the form of the PIN code of the wireless device 30B, and the registered data stored in the wireless device 30B, by using the public key of the wireless device 30A received in step SE1 from the wireless device 30A. The encrypted data are transmitted from the wireless device 30B toward the wireless device 30A.

In the following step SE4 corresponding to the reply-data receiving portion 106, the transmitter/receiver portion 54 of the wireless device 30A receives the data (reply packet) transmitted in sep SE3 from the wireless device 30B, and the encrypting/de-encrypting portion 64 de-encrypts the received data.

In the following step SE5, the communication verifying portion 68 of the wireless device 30A determines whether the communication of the wireless device 30B with the wireless device 30A has been effected correctly. This determination is made by determining whether the challenge value has been correctly de-encrypted in step SE4. If an affirmative determination is obtained in step SE5, that is, if the communication verifying portion 68 has verified that the communication between the wireless devices 30A and 30B has been effected correctly without falsification, the control flow goes to step SE6. If a negative determination is obtained in step SE5, that is, if the communication verifying portion 68 has detected a risk of falsification of the communication from the wireless device 30B to the wireless device 30A, the control flow goes to step SE8, while skipping steps SE6 and SE7.

In step SE6, the wireless device 30A compares the registered data stored in its memory portion 56 with the registered data (including the pin code) of the wireless device 30B which have been de-encrypted in step SE4. That is, the wireless device 30A determines whether the registered data of the wireless device 30B have already been stored in the memory portion 56 of the wireless device 30A. If a negative determination is obtained in step SE6, that is, if the registered data of the wireless device 30B have not already been stored in the memory portion 56 of the wireless device 30A, the control flow goes to step SE7. If an affirmative determination is obtained in step SE6, that is, if the registered data of the wireless device 30B are included in the registered data already stored in the memory portion 56 of the wireless device 30A, the control flow goes to step SE8, while skipping step SE7.

In the step SE7, the registered data (including the PIN code) of the wireless device 30B which have not been stored in the memory portion 56 of the wireless device 30A are stored in the memory portion 56. As a result, the entirety of the registered data of the wireless device 30B are now stored in the memory portion 56 of the wireless device 30A.

Step SE8 is provided to determine whether a predetermined time has elapsed after the moment of transmission of the signal to search for the other wireless devices 30 in step SE1. This predetermined time is determined on the basis of the time required for implementation of steps SE2-SE7 and the number of the existing wireless devices 30. Described more specifically, the predetermined time is determined to be long enough to permit steps SE2-SE7 to be implemented with wireless communication of the wireless device 30A with all of the other wireless devices 30B, 30C in the specific example of the wireless LAN shown in FIG. 5. If a negative determination is obtained in step SE8, the control flow goes back to step SE3 to wait for the data-supply-request reply packet from the other wireless device 30 other than the wireless device 30B, for example, from the wireless device 30C, and to steps SE4-SE7 if the data-supply-request reply packet has been received by the wireless device 30A. If an affirmative determination is obtained in step SE8, it indicates that the registered data of all of the other wireless devices 30 have been stored in the memory portion 56 of the wireless device 30A. In this case, the control flow goes to step SE9.

In step SE9, the wireless device 30A transmits its registered data to the wireless device 30B from which the data-supply-request reply has been transmitted in step SE3. Described in detail, the encrypting/de-encrypting portion 64 of the wireless device 30A encrypts the challenge value, PIN code (identifier) and registered data of the wireless device 30A, by using the PIN code of the wireless device 30B transmitted in step SE3, and transmits the encrypted data to the wireless device 30B. The challenge value to be encrypted in step SE9 is the challenge value which was transmitted from the wireless device 30A in step SE1.

In the following step SE10, the transmitter/receiver portion 54 of the wireless device 30B receives the data transmitted from the wireless device 30A in step SE9, and the encrypting/de-encrypting portion 64 de-encrypts the received data.

In following step SE11 the communication verifying portion 68 of the wireless device 30B determines whether the communication of the wireless device 30A with the wireless device 30B has been effected correctly. This determination is made by determining whether the challenge value has been correctly de-encrypted in step SE9. If an affirmative determination is obtained in step SE11, that is, if the communication verifying portion 68 has verified that the communication between the wireless devices 30A and 30B has been effected correctly without falsification, the control flow goes to step SE12. If a negative determination is obtained in step SE11, that is, if the communication verifying portion 68 has detected a risk of falsification of the communication from the wireless device 30A to the wireless device 30B, the present routine is terminated, without implementing the following steps SE12 and SE13.

In step SE12, the wireless device 30B compares the registered data stored in its memory portion 56 with the registered data (including the pin code) of the wireless device 30A which have been de-encrypted in step SE10. That is, the wireless device 30B determines whether the registered data of the wireless device 30A have already been stored in the memory portion 56 of the wireless device 30B. If a negative determination is obtained in step SE12, that is, if the registered data of the wireless device 30A have not already been stored in the memory portion 56 of the wireless device 30B, the control flow goes to step SE13. If an affirmative determination is obtained in step SE12, that is, if the registered data of the wireless device 30A are included in the registered data already stored in the memory portion 56 of the wireless device 30B, the present routine is terminated without implementing step SE13.

In the step SE13, the registered data (including the PIN code) of the wireless device 30A which have not been stored in the memory portion 56 of the wireless device 30BA are stored in the memory portion 56. As a result, the entirety of the registered data of the wireless device 30A are now stored in the memory portion 56 of the wireless device 30B. Steps SE9-SE13 are repeated for each of the other wireless devices 30 other than the wireless device 30B, that is, for the wireless device 30C in the example of the wireless LAN of FIG. 5. The steps SE5-SE13 correspond to the identifier retrieving portion 108 described above.

As a result of execution of the data supplying and receiving routine in step SD1 of the flow chart of FIG. 8, the registered data stored in the memory portion 56 of the wireless device 30B are also stored in the memory portion 56 of the wireless device 30A, while the registered data stored in the memory portion 56 of the wireless device 30A are also stored in the memory portion 56 of the wireless device 30B. Thus, the same registered data are stored in the memory portions 56 of the wireless devices 30A and 30B. The registered data stored in the memory portion 56 of the wireless device 30A include the registered data of the other wireless devices 30 which are communicable with the wireless device 30A and the data supplying and receiving portions 66 of which are enabled by the operation setup portion 67. While the operations in steps SE9-SE13 have been described above with respect to the wireless device 30B which has transmitted the reply to the data-supply request packet received from the wireless device 30A in step SE3 have been described above, those steps SE9-SE13 are repeatedly implemented with respect to any other wireless device (30C, for example) which has transmitted the reply to the data-supply request packet.

Step SD1 of the flow chart of FIG. 8 is followed by step SD2 corresponding to the registrar setup portion 88. In this step SD2, the wireless device 30 which has executed the data supplying and receiving routine in step SD1, for example, the wireless device 30A is registered as the registrar 20. Described in detail in the case of the wireless device 30A, by way of example, the wireless device 30A which has been placed in the ad hoc mode is brought into the infrastructure mode in which the wireless device 30A is permitted to communicate with the access point 10. Further, the user enters the identifier in the form of the PIN code of the access point 10, so that the wireless device 30A is registered as the registrar 20, by the access point 10. The registration of the wireless device 30A as the registrar 20 may be implemented according to the above-described routine illustrated in the flow chart of FIG. 3, for example.

In the next step SD3 corresponding to the registrar registering portion 114, the wireless devices 30 are registered in the registrar 20 on the basis of the registered data stored in the wireless device 30A which has been registered as the registrar 20 by the access point 10. Described in detail, the identifier data of all wireless devices 30 stored in the memory portion 56 of the wireless device 30A are stored in the registrar 20. The content of the memory portion 56 of the wireless device 30A includes the registered data of the other wireless devices 30 which are communicable with the wireless device 30A and which have replied to the data-supply request packet in step SD1, that is, the wireless devices 30 the data supplying and receiving portions 66 of which are enabled by the operation setup portions 67. Accordingly, all of the wireless devices 30 which are communicable with the wireless device 30A and the data supplying and receiving portions 66 of which are enabled by the operation setup portions 67 are registered in the registrar 20, so that these wireless devices 30 are permitted to communicate with the access point 10.

In the embodiment described above, the data-supply requesting portion 102 of each wireless device 30 which has not been set up transmits the data-supply request packet in at least the ad hoc mode in step SE1, and the registered data stored in the memory portion 56 is transmitted to each of the other wireless devices 30 which has replied to the data-supply request packet in step SE3. If the registered data received by the other wireless device 30 from the wireless device 30 in question have not been stored in the memory portion 56 of the other wireless device 30 ("No" in step SE6), the received registered data are stored in the memory portion of the other wireless device 30 in step SE7. On the other hand, the registered data stored in the memory portion 56 of the other wireless device 30 are transmitted to the wireless device 30 in question in step SE9, and are stored by the identifier retrieving portion 108 into the memory portion 56 of the wireless device 30 in question in step SE 13, if the received registered data of the other wireless device 30 have not been stored in its memory portion 56 ("No" in step SE12). When the wireless device 30 in question is registered as the registrar by the registrar setup portion 88 of the access point 10 in step SD2, the other wireless devices 30 specified by the registered data stored in the memory portion 56 of the wireless device 30 in question are registered in step SD3 as the wireless devices 30 which are permitted to communicate with the access point 10. Thus, it is not necessary to store the identifier of each of the wireless devices in the registrar, so that the wireless LAN can be easily set up as a wireless network constituted by the plurality of wireless devices.

The registered data stored in the memory portion 56 of each of the wireless devices 30 are transmitted by the request replying portion 102, and the transmitted registered data are stored in the memory portion 56 of the other wireless devices 30 by its identifier retrieving portion 108. Therefore, the identifiers of the same wireless devices 30 are stored in the memory portion 56 of each wireless device 30. Namely, the same identifiers are stored in the memory portions 56 of all wireless devices 30, as a result of the operation of the data supplying and receiving portions 66 of the wireless devices 30. Accordingly, the wireless LAN can be constituted by the plurality of wireless devices 30, irrespective of one of the wireless devices 30 which is selected as the registrar 20 by the registrar setup portion 88 of the access point 10.

The embodiment described above is further arranged such that each of the wireless devices 30 constituting the wireless LAN includes a reply setup portion in the form of the operation setup portion 67 (step SE2) which selectively enables or disables the request replying portion 104 (step SE3) of the data supplying and receiving portion 66 to operate. When the request replying portion 104 is disabled by the operation setup portion 67, the identifier of each wireless device 30 is not transmitted by the data supplying and receiving portion 66 to the other wireless device 30 which from which the data-supply request packet has been received at the predetermined time interval (in step SE1). Therefore, the operation setup portion 67 of each wireless device 30 makes it possible to inhibit that wireless device 30 to join the wireless LAN. That is, the addition of the unintended wireless device 30 to the wireless LAN can be prevented.

Second Embodiment

Figure 11:
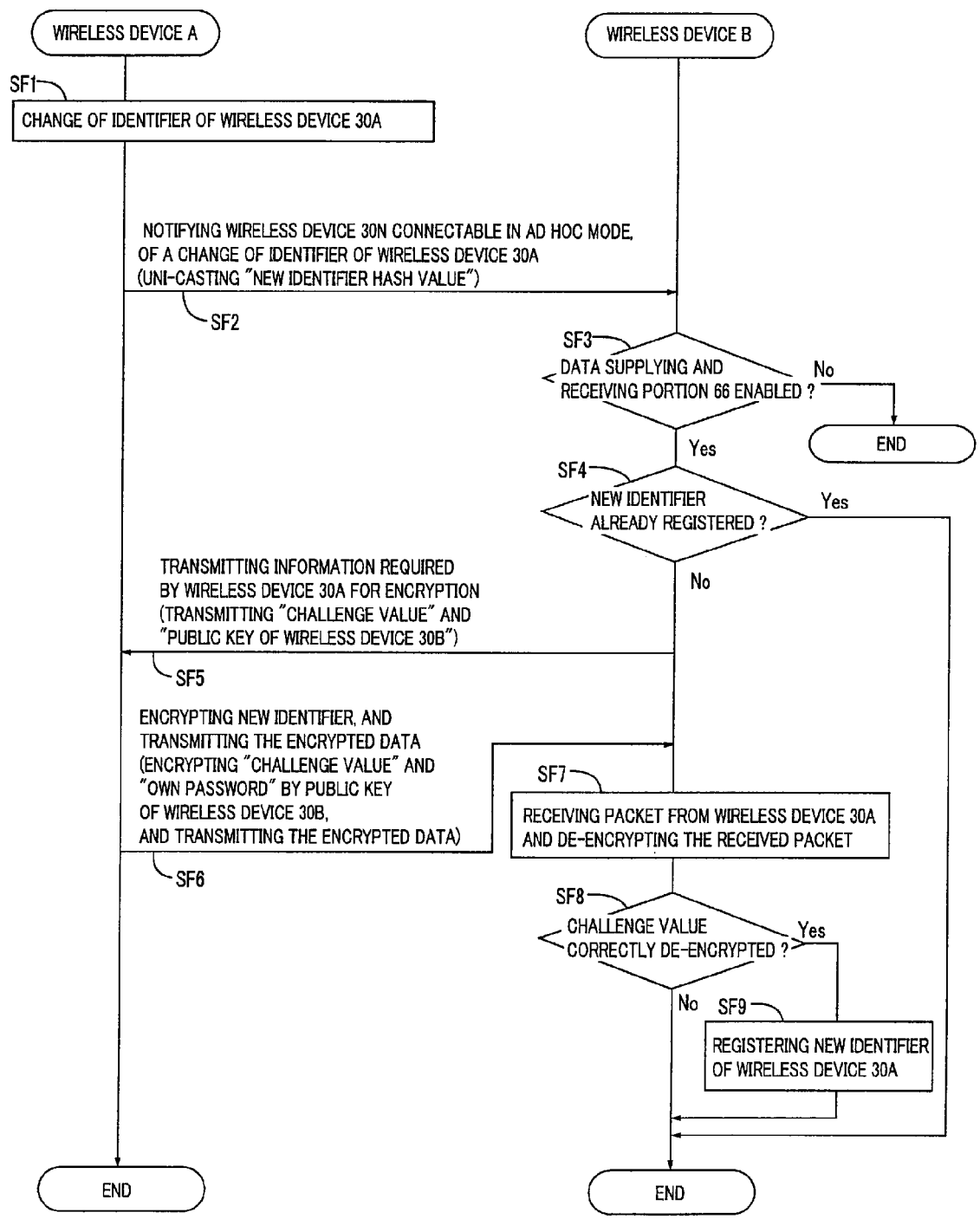
FIG. 11 is a flow chart illustrating an operation to update the registered data, which is performed when an identifier of a wireless device is changed, in a second embodiment of the invention.

Referring next to the flow chart of FIG. 11, there is illustrated a routine for automatically updating the identifier (PIN code) of one of the wireless devices 30 of the wireless LAN of FIG. 5 which has been set up or configured according to the routine of FIG. 8, in a second embodiment of this invention. This routine is executed by an identifier updating portion 112 of the data supplying and receiving portion 66. The data supplying and receiving portion 66 further includes a comparator portion 110 which is configured to compare the registered data stored in the memory portion 56 of the wireless device 30 in question, with the registered data which are stored in the memory portion 56 of the other wireless device 30 and which have been retrieved by the identifier retrieving portion 108 of the wireless device 30 in question. That is, the comparator portion 110 is configured to detect a change of the identifier of any other wireless device 30. When the comparator portion 110 of the wireless device 30 in question has detected a change of the identifier of any other wireless device 30, the identifier updating portion 112 updates the identifier of this other wireless device 30, that is, replaces the presently stored identifier of the other wireless device 30 with the new identifier which has been retrieved by the identifier retrieving portion 108.

The routine of FIG. 11 is initiated with step SF1 in which the identifier of the wireless device 30A of the wireless LAN is changed.

Step SF1 is followed by step SF2 in which the wireless device 30A notifies the other wireless devices 30 communicable in the ad hoc mode, of a change of the identifier (PIN code) of the wireless device 30A. That is, a hash value of the new PIN code of the wireless device 30A is transmitted in a uni-casting fashion to the other wireless device 30B, for example, by specifying the wireless device 30B as a receiver of the hash value. In the uni-casting transmission, an IP address specifying the receiver is used in the present embodiment. FIG. 12 indicates an example of registered data where the IP address is used to specify the receiver. In this example, the registered data consist of a MAC address, an IP address and an identifier.

Then, the control flow goes to step SF3 to determine whether the data supplying and receiving portion 66 of the wireless device 30B which has been notified in step SF2 of the change of the identifier of the wireless device 30A is enabled by the operation setup portion 67. If an affirmative determination is obtained in step SF3, that is, if the data supplying and receiving portion 66 is enabled, the control flow goes to step SF4. If a negative determination is obtained in step SF3, that is, if the data supplying and receiving portion 66 is disabled, the present routine is terminated. In the present embodiment, the operation setup portion 67 (step SF3) functions as a common reply setup portion.

The step SF4 corresponding to the comparator portion 110 is provided to determine whether the new identifier of the wireless device 30A has already been registered in the memory portion 56 of the wireless device 30B. This determination is made by comparing the identifier of the wireless device 30A included in the registered data stored in the memory portion 56 of the wireless device 30B, with the new identifier received in step SF2 from the wireless device 30A. For instance, step SF4 is arranged to compare a hash value of the PIN code of the wireless device 30A presently stored in the wireless device 30B is the hash value of the new PIN code of the wireless device 30A received in step SF2. If these hash values are the same, it indicates that the new identifier of the wireless device 30A has been registered in the memory portion 56 of the wireless device 30B. In this case, an affirmative determination is obtained in sep SF4, and the present routine is terminated. If the two hash values are different from each other, it indicates that the new identifier of the wireless device 30A has not been registered in the wireless device 30B. In this case, a negative determination is obtained in step SF4, and the control flow goes to step SF5.

Step SF5 and the following steps SF6-SF9 correspond to the identifier updating portion 112. In step SF5, the wireless device 30B which has received the notice from the wireless device 30A in step SF2 transmits to the wireless device 30A information required in step SG6 for encryption by the wireless device 30A to notify the wireless device 30B of the new identifier of the wireless device 30A. The information required for the encryption includes, for example, a "public key" where the communication of the wireless device 30A with the wireless device 30B is effected according to the public key cryptosystem. Where the authentication is made according to CHAP (Challenge Handshake Authentication Protocol), a "challenge value" is also transmitted from the wireless device 30B to the wireless device 30A.

Step SF5 is followed by step SF6 in which the transmitter/receiver portion 54 of the wireless device 30A encrypts the new identifier, and transmits the encrypted data to the wireless device 30B In the following step SF7, the transmitter/receiver portion 54 of the wireless device 30B receives the encrypted data transmitted from the wireless device 30A in step SF6, and the encrypting/de-encrypting portion 64 of the wireless device 30B de-encrypts the received encrypted data.

In the following step SF8, the communication verifying portion 68 of the wireless device 30B determines whether the communication of the wireless device 30A with the wireless device 30B has been effected correctly. This determination is made by determining whether the challenge value has been correctly de-encrypted in step SF7. If an affirmative determination is obtained in step SE8, that is, if the communication verifying portion 68 has verified that the communication between the wireless devices 30A and 30B has been effected correctly without falsification, the control flow goes to step SF9. If a negative determination is obtained in step SF8, that is, if the communication verifying portion 68 has detected a risk of falsification of the communication from the wireless device 30A to the wireless device 30B, the present routine is terminated, without implementation of step SF9.

In step SF9, the identifier of the registered data presently stored in the memory portion 56 of the wireless device 30B is replaced by the new identifier of the wireless device 30A which is obtained by de-encrypting the encrypted data received in step SF7. Steps SF3-SF9 are repeatedly implemented for each of the other wireless devices 30 other than the wireless device 30B, which have been notified of the change of the identifier of the wireless device 30A in the ad hoc mode.

In the second embodiment described above, the memory portion 56 of each wireless device 30 stores device-specific data in the form of the IP address specifying the wireless device 30, in relation to the identifier in the form of the PIN code identifying the wireless device 30. When the PIN code (identifier) of the wireless devices 30A is changed, the new pin code of the wireless device 30A is transmitted to the other wireless device 30B, together with the IP address specifying the wireless device 30B, such that the PIN code and the IP address are related to each other. When the comparator portion 110 (step SF4) detects that the PIN code presently stored in the memory portion 56 of the wireless device 30B in relation to the IP code received from the wireless device 30A is different from the PIN code received from the wireless device 30A, the identifier updating portion 112 (steps SF5-SF9) replaces the PIN code presently stored in the memory portion 56 of the wireless device 30B to the new PIN code received from the wireless device 30A. Thus, the identifier in the form of the PIN code of each wireless device 30 of the wireless network in the form of the wireless LAN can be updated by using the IP address specifying each wireless device 30.

Third, Fourth, Fifth, Sixth and Other Embodiments

While the first and second embodiments of the present invention have been described above in detail by reference to FIGS. 5-12, the present invention may be otherwise embodied.

According to a third embodiment of this invention, the wireless devices 30 of the wireless LAN include at least one wireless device 30 each of which includes a printer portion in addition to the functional portions shown in the block diagram of FIG. 6. The printer portion is operable to print the registered data stored in the memory portion 56. An operation of the printer portion is controlled according to a control routine illustrated in the flow chart of FIG. 13. This control routine is executed as an interruption routine during execution of the routine of FIG. 8. The control routine is initiated with step SG1 to determine whether an operation of the printer portion to print the registered data is required by the user. If an affirmative determination is obtained in step SG1, the control flow goes to step SG2 in which the registered data stored in the memory portion 56 is printed by a suitable printing means of the printer portion. The wireless device 30 including the printer portion may be a printer capable of wireless communication.

According to a fourth embodiment of the invention, the wireless devices 30 of the wireless LAN include at least one wireless device 30 each of which includes a display portion such as a display panel in addition to the functional portions shown in FIG. 6. The display portion is operable to display the registered data stored in the memory portion 56. An operation of the display portion is controlled according to a control routine illustrated in the flow chart of FIG. 14. This control routine is executed as an interruption routine during execution of the routine of FIG. 8. The control routine is initiated with step SH1 to determine whether an operation of the display portion to display the registered data is required by the user. If an affirmative determination is obtained in step SH1, the control flow goes to step SH2 in which the registered data stored in the memory portion 56 is displayed by a suitable displaying means of the display portion. The wireless device 30 including the display portion may be a display device capable of wireless communication.

Figure 15:
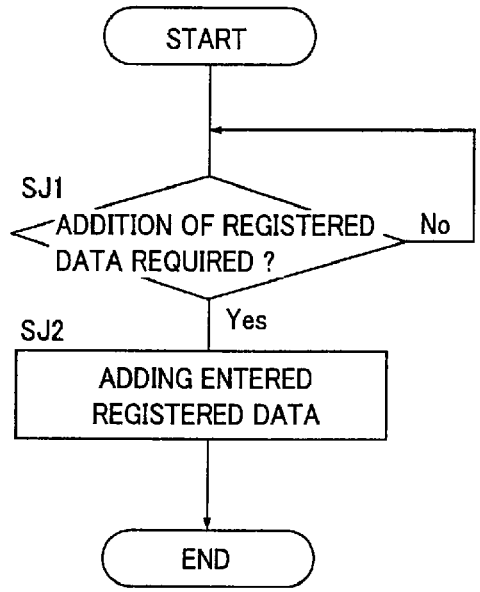
FIG. 15 is a flow chart illustrating an operation of the wireless device where the wireless device has a function to permit the user to add the registered data, in a fifth embodiment of the invention.
Figure 16:
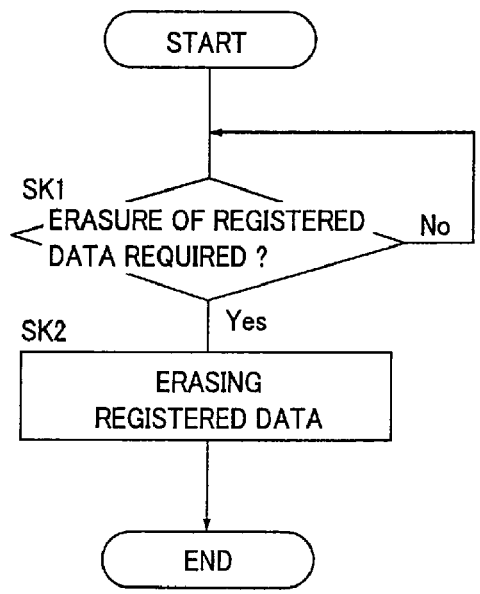
FIG. 16 is a flow chart illustrating an operation of the wireless device wherein the wireless device has a function to permit the user to erase the registered data, in a sixth embodiment of the invention.

In the first embodiment, the registration of one of the wireless devices 30 is made on the basis of the registered data stored in the wireless device 30 as a result of the automatic supply and reception of the registered data. However, the user may add or erase the registered data of the desired wireless device 30. An operation for addition of the registered data by the user according to a fifth embodiment of the invention is controlled according to a control routine illustrated in the flow chart of FIG. 15, while an operation for erasure of the registered data by the user according to a sixth embodiment of the invention is controlled according to a control routine illustrated in the flow chart of FIG. 16. These control routines are executed as interruption routines during execution of the routine of FIG. 8. The control routine of FIG. 15 is initiated with step SJ1 to determine whether an operation to add the registered data of the desired wireless device 30 has been performed by the user. If an affirmative determination is obtained in step SJ1, the control flow goes to step SJ2 in which the registered data to be added by the user is stored in the memory portion 56 of the desired wireless device 30. The control routine of FIG. 16 is initiated with step SK1 to determine whether an operation to erase the registered data of the desired wireless device 30 has been performed by the user. If an affirmative determination is obtained in step SK1, the control flow goes to step SK2 in which the registered data to be erased by the user is erased from the memory portion 56 of the desired wireless device 30.

In the first embodiment, the wireless device 30B which has received the data-supply request transmitted from the wireless device 30A in step SE1 (corresponding to common data-supply requesting portion) transmits a reply to the data-supply request to the wireless device 30A in step SE3 only if the data supplying and receiving portion 66 has been enabled by the common reply setup portion in the form of the operation setup portion 67 in step SE2. However, this arrangement is not essential. For instance, the wireless LAN may be arranged such that the wireless device 30B does not reply to the data-supply request from the wireless device 30A if the registered data of the wireless device 30A as indicated in FIG. 10 or 12 indicate that the wireless device 30B is not permitted to reply to the data-supply request received from the wireless device 30A. This arrangement prevents the unintended wireless device 30 from joining the wireless LAN.

In the first embodiment of FIGS. 8 and 9, the wireless device 30A which has received the data-supply-request reply packet from the wireless device 30B in steps SE1-SE8 transmits the registered data of the wireless device 30A to the wireless device 30B in steps SE9-SE13. In this case, the steps SE5-SE13 correspond to the identifier retrieving portion 108 on the side of the wireless device 30B. However, the wireless device 30B need not receive the registered data of the wireless device 30A directly from the wireless device 30A, and may receive the registered data from the other wireless device. Namely, steps S9-S13 in the flow chart of FIG. 9 are not essential and may be eliminated. In this case, steps SE5-SE8 correspond to the identifier retrieving portion.

While the PIN code is used as the identifier in the illustrated embodiments, the identifier is not limited to the PIN code and may take any other form such as a password. The functional portions of each wireless device 30 are not limited to those shown in FIG. 6 by way of example. For instance, the wireless device 30 need not include the main body portion 70.

In the second embodiment described above, the notification of the change of the identifier of each wireless device 30 is effected by transmitting the hash value of the new identifier in the uni-casting fashion. However, the notification may be effected by any other method provided that this method permits transmission of the hash value of the new identifier.

What is claimed is:

1. A wireless network system comprising an access point and a plurality of wireless devices, each of which plurality of wireless devices is configured to communicate wirelessly with the access point or directly with each other in an ad hoc mode without communication via the access point, the access point comprising a registrar setup portion configured to establish each of the plurality of wireless devices as a registrar which establishment permits wireless communication between each of the wireless devices and the access point, and each of the plurality of wireless devices comprising:
a memory portion for storing a unique identifier for each of the plurality of wireless devices;
a data-supply requesting portion configured to transmit at a predetermined time interval in the ad hoc mode to each of the other wireless devices a data-supply request packet requesting each of the other wireless devices to transmit the identifier of each of the other wireless devices stored in the memory portion of that other wireless device;
a request replying portion configured to respond to the data-supply request packet received from each of the other wireless devices by transmitting to each of the other wireless devices a data-supply-request reply packet including the identifier of that other wireless device;
a reply-data receiving portion configured to receive the data-supply-request reply packet transmitted from each of the other wireless devices;
an identifier retrieving portion configured to retrieve the identifier of that other wireless device from the data-supply-request reply packet received by the reply-data receiving portion and to store the retrieved identifier in the memory portion; and
a registrar registering portion configured to register each of the other wireless devices, the identifier of which is stored in the memory portion, as one of the plurality of wireless devices, which are permitted to effect wireless communication with the access point, after each of the plurality of wireless devices is established as the registrar by the registrar setup portion of the access point.

2. The wireless network system according to claim 1, wherein said identifier retrieving portion stores the retrieved identifier in the memory portion, if the retrieved identifier has not already been stored in the memory portion.

3. The wireless network system according to claim 1, wherein each of the plurality of wireless devices further comprises a reply setup portion configured to selectively enable or disable operation of the request replying portion.

4. The wireless network system according to claim 1, wherein the memory portion of each of the plurality of wireless devices further stores device-specific data specifying each of the plurality of other wireless devices, in relation to the identifier of the corresponding wireless device, and the request replying portion transmits the data-supply-request reply packet which includes the identifier and the device-specific data which correspond to each of the other wireless devices, the reply-data receiving portion receiving the data-supply-request reply packet including the identifier and the device-specific data, the identifier retrieving portion storing the identifier and the device-specific data in the memory portion, and wherein each of the plurality of wireless devices comprises:
a comparator portion configured to compare each of the identifiers stored in the memory portion in relation to the device-specific data, with each of the identifiers received by the reply-data receiving portion together with the same device-specific data, to determine whether any of the identifiers stored in the memory portion in relation to the device-specific data is different from any of the identifiers received by the reply-data receiving portion with the same device-specific data; and
an identifier updating portion configured to control the identifier retrieving portion such that the identifier stored in the memory portion is replaced by the identifier received by the reply-data receiving portion, when the comparator portion has determined that the identifier stored in the memory portion is different from the identifier received by the reply-data receiving portion.

5. The wireless network system according to claim 4, wherein said identifier retrieving portion stores the identifier and the device-specific data in the memory portion, if the identifier and the device-specific data have not already been stored in the memory portion, in relation to each other.

6. A wireless device configured to communicate wirelessly with an access point which access point comprises a registrar setup portion configured to establish the wireless device as a registrar which establishment permits wireless communication of the wireless device with the access point, the wireless device configured to communicate directly with another wireless device in an ad hoc mode without communication via the access point, the wireless device comprising:
a memory portion for storing an identifier of said another wireless device;
a data-supply requesting portion configured to transmit at a predetermined time interval to said another wireless device in the ad hoc mode a data-supply request packet requesting said another wireless device to transmit the identifier of said another wireless device stored in the memory portion of said another wireless device;
a reply-data receiving portion configured to receive the data-supply-request reply packet including the identifier of said another wireless device and transmitted from said another wireless device;
an identifier retrieving portion configured to retrieve the identifier of said another wireless device from the data-supply-request reply packet received by the reply-data receiving portion and to store the retrieved identifier in the memory portion, if the retrieved identifier has not already been stored in the memory portion; and
a registrar registering portion configured to register said another wireless device, the identifier of which is stored in the memory portion, as the wireless device which is permitted to effect wireless communication with the access point, after each of the wireless devices is established as one of the registrars by the registrar setup portion of the access point.

7. The wireless device according to claim 6, wherein said identifier retrieving portion stores the retrieved identifier in the memory portion, if the retrieved identifier has not already been stored in the memory portion.

8. The wireless device according to claim 6, further comprising a reply setup portion configured to selectively enable or disable operation of the request replying portion.

9. The wireless device according to claim 6, wherein the memory portion further stores device-specific data specifying each of the wireless devices, in relation to the identifier of the corresponding wireless device, and the request replying portion transmits the data-supply-request reply packet which includes the identifier and the device-specific data which correspond to each other, the reply-data receiving portion receiving the data-supply-request reply packet including the identifier and the device-specific data, the identifier retrieving portion storing the identifier and the device-specific data in the memory portion, and wherein the wireless device comprises:
- a comparator portion configured to compare the identifier stored in the memory portion in relation to the device-specific data, with the identifier received by the reply-data receiving portion together with the same device-specific data, to determine whether the identifier stored in the memory portion is different from the identifier received by the reply-data receiving portion; and
- an identifier updating portion configured to control the identifier retrieving portion such that the identifier stored in the memory portion is replaced by the identifier received by the reply-data receiving portion, when the comparator portion determines that the identifier stored in the memory portion is different from the identifier received by the reply-data receiving portion.

10. The wireless device according to claim 9, wherein said identifier retrieving portion stores the identifier and the device-specific data in the memory portion, if the identifier and the device-specific data have not already been stored in the memory portion, in relation to each other.

11. The wireless device according to claim 6, further comprising a printer portion configured to print a content of the memory portion.

12. The wireless device according to claim 6, further comprising a display portion configured to display a content of the memory portion.

* * * * *